Nov. 26, 1963  E. A. KOPP  3,111,706
ABATTOIR APPARATUS
Filed Sept. 12, 1960  5 Sheets-Sheet 1
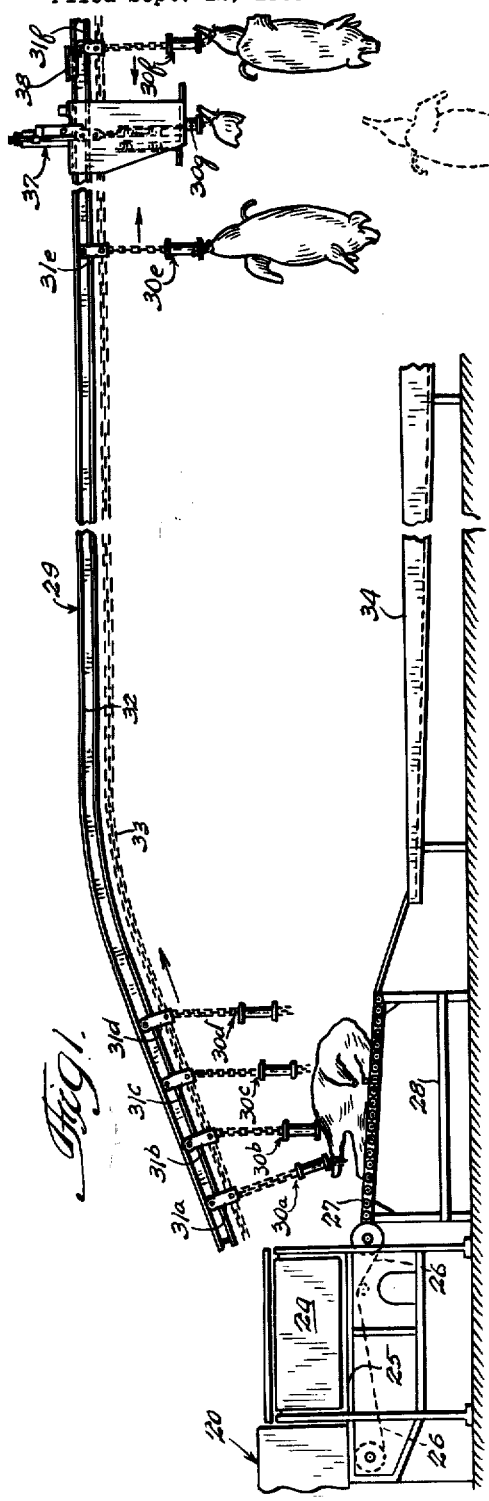
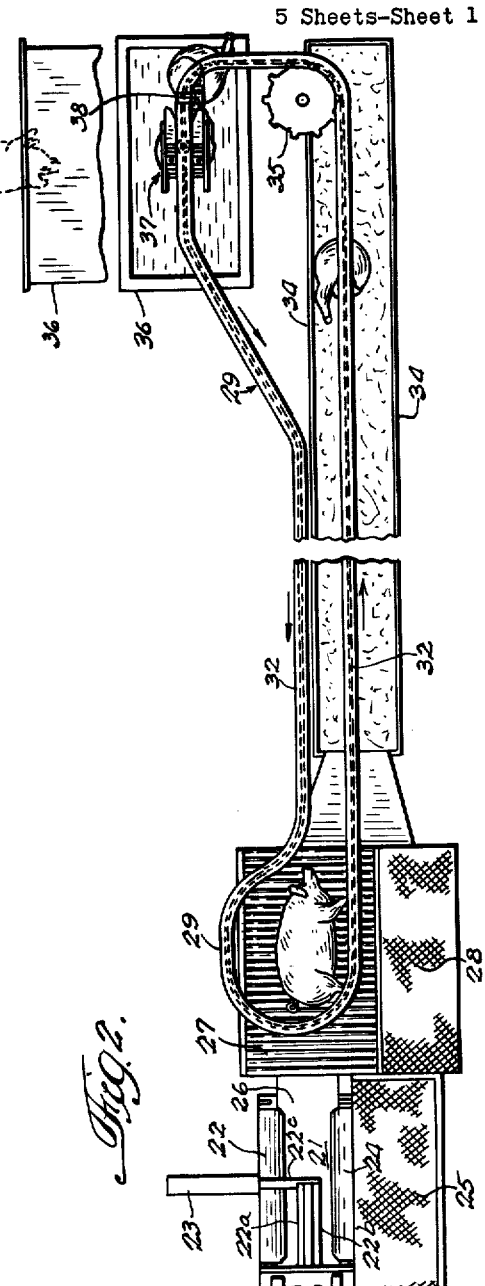
INVENTOR.
Ernest A. Kopp
BY
Olson, Mecklenburger, von Holst,
Pendleton & Neuman. Attys.

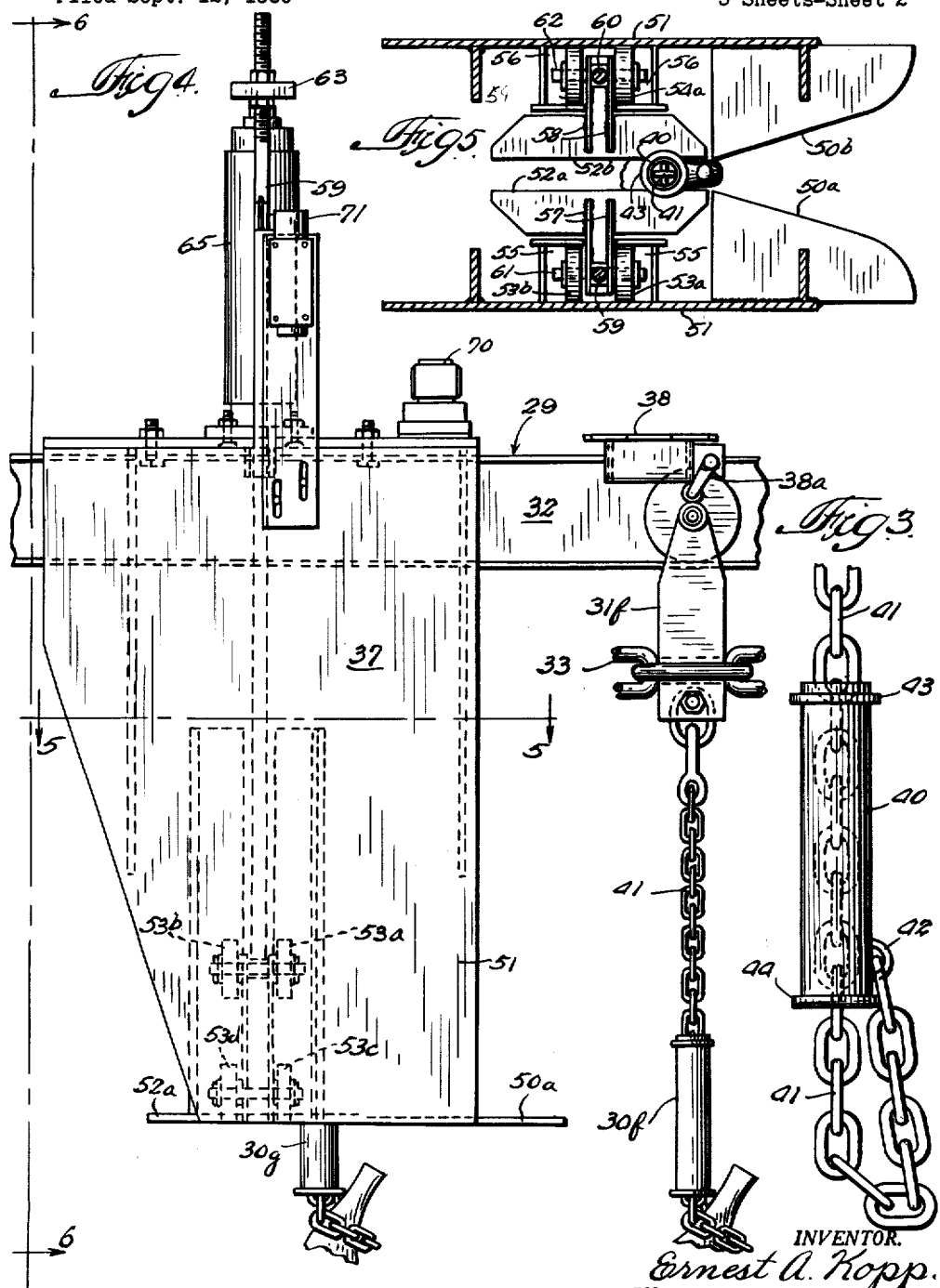

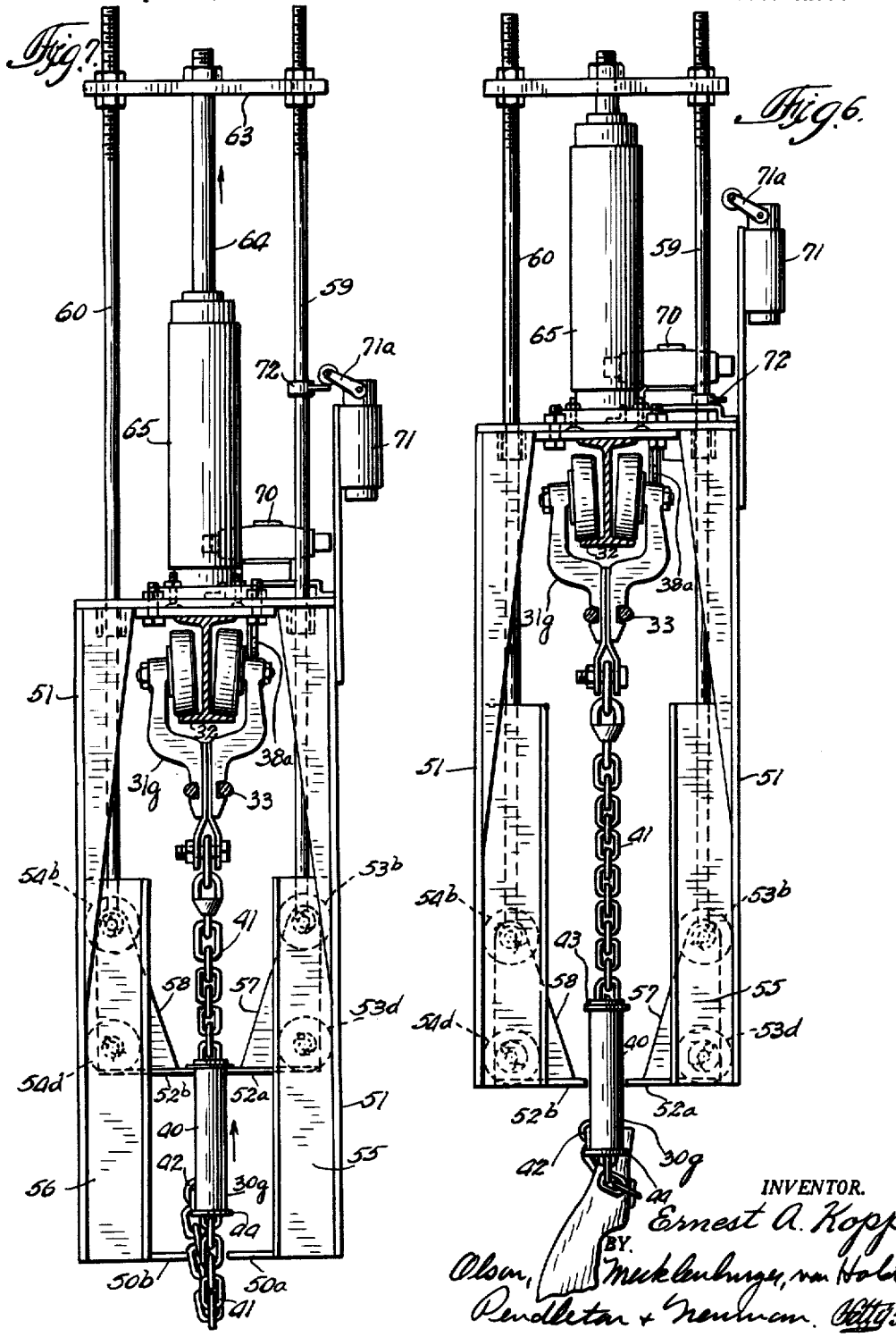

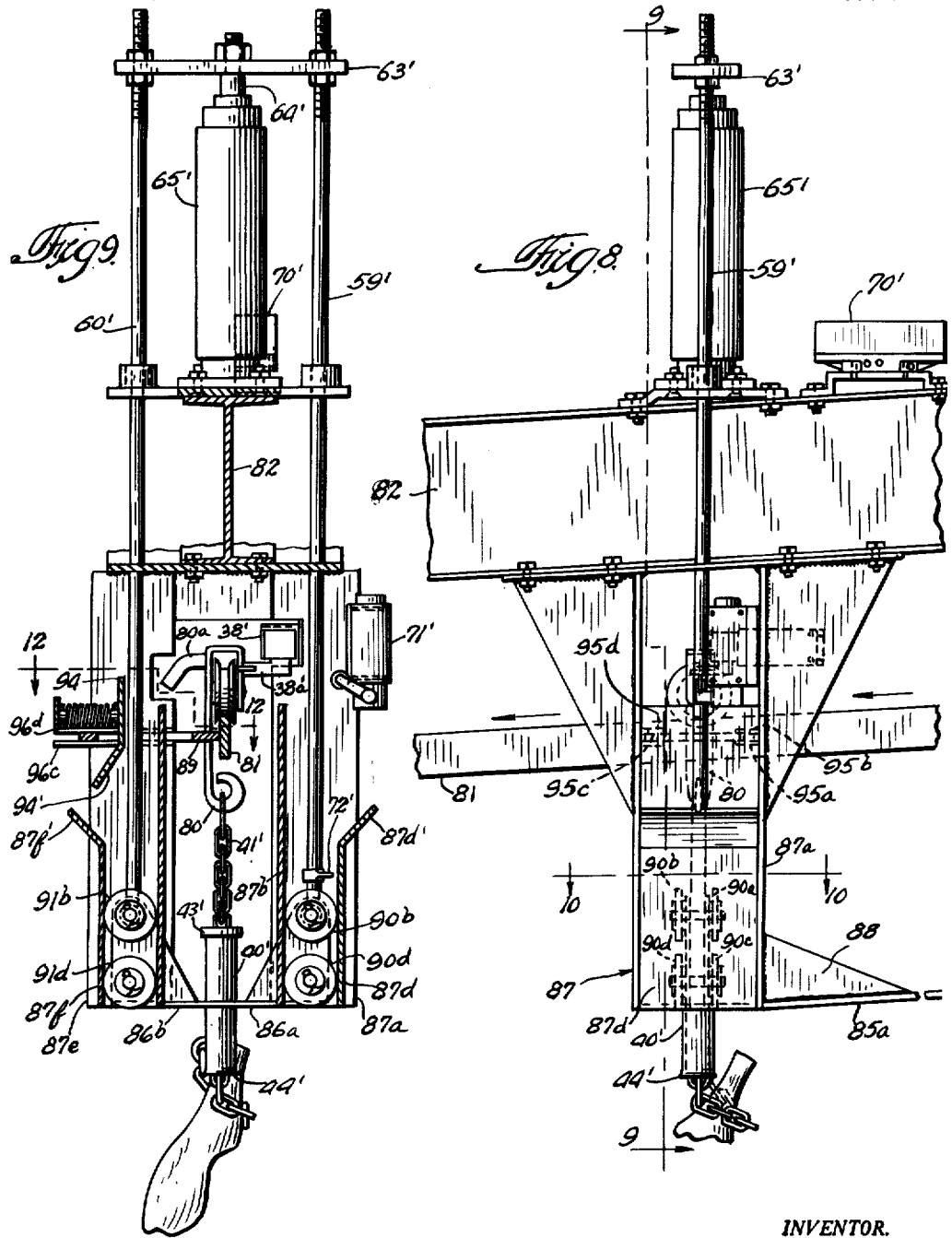

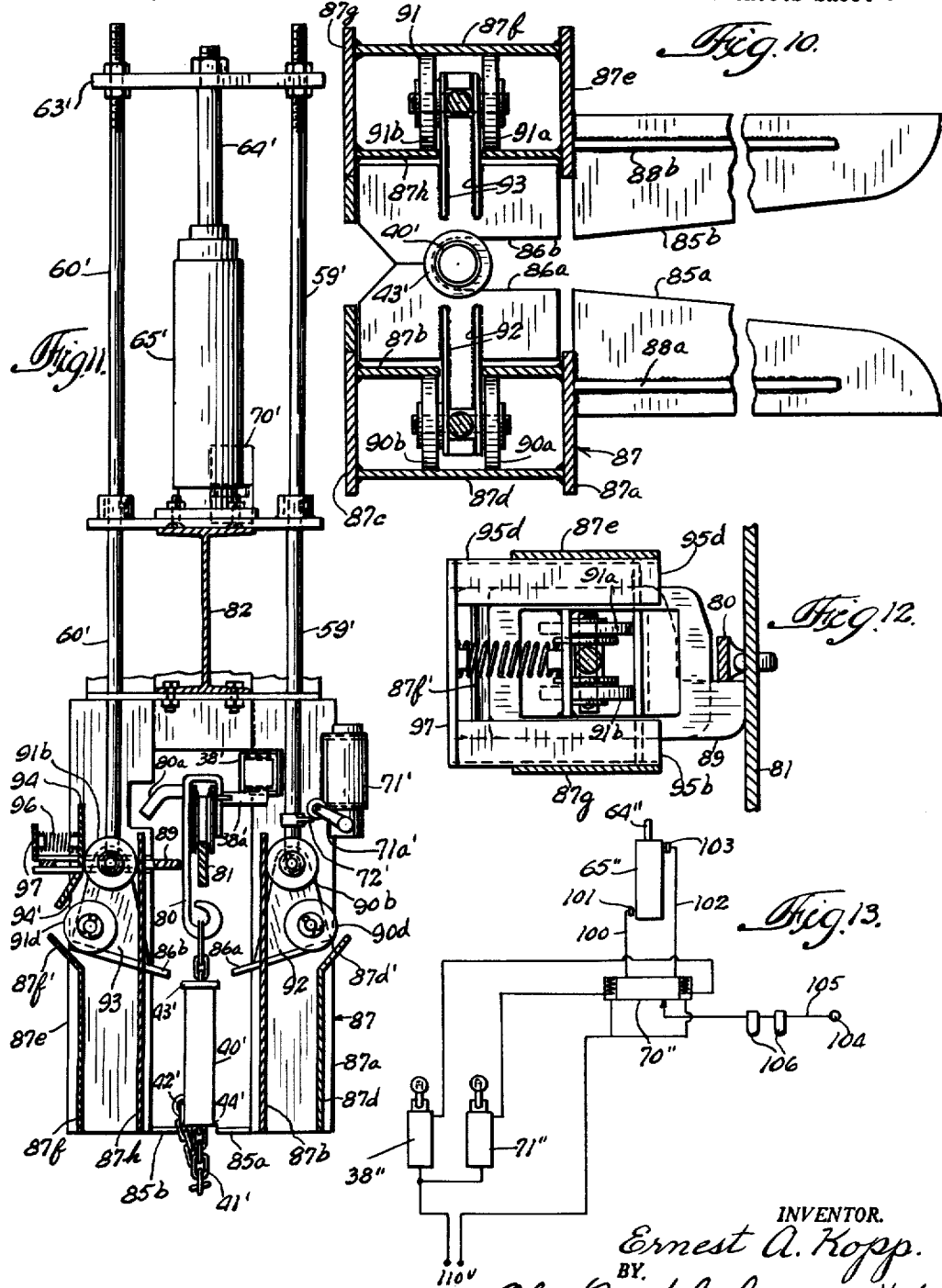

United States Patent Office 3,111,706
Patented Nov. 26, 1963

3,111,706
ABATTOIR APPARATUS
Ernest A. Kopp, Oak Lawn, Ill., assignor, by mesne assignments, to St. John & Company, Chicago, Ill., a corporation of Illinois
Filed Sept. 12, 1960, Ser. No. 55,561
17 Claims. (Cl. 17—24)

This invention relates to an apparatus used in connection with the conveying of animals in an abattoir. More specifically, it relates to an improved and humane slaughterhouse shackle which is advantageously used therein for suspending animals and carcasses from overhead conveyor systems and an apparatus for automatically and economically unshackling the carcass therefrom.

Because of highly-competitive conditions and the high-cost of hand labor, modern packinghouse operations are becoming highly mechanized to achieve the fullest benefit from mass-production techniques. Further, humane slaughtering practices have recently been introduced. The present invention relates to one facet of these recent trends and has contributed to a substantial reduction in costs as well as many other benefits. While the present invention will be described in connection with this particular facet, it should be recognized from the outset that it is not necessarily limited thereto. Those who are skilled in the art of packinghouse operations and, more generally, in the field of commodity handling by means of overhead conveyor systems, will recognize, in the light of the following disclosure, many additional advantageous applications of the present invention. It should be understood, therefore, that such additional applications are considered within the scope of the present invention.

Heretofore in the slaughterhouse processing of certain animals, particularly hogs, an initial step of one procedure was the attachment of a chain to a rear leg of the animal while the animal was still conscious. The animal was then suspended head downward by means of the chain from an overhead rail system during the subsequent dispatching and bleeding operation. After bleeding, the animal was subjected to further processing, e.g., dehairing, which includes as a first step a scalding operation. For such further processing, the carcass had to be released from the conveyor system by releasing the securing chain.

Because of the peculiar method of attaching the chain, the release operation proved to be time-consuming and costly. Specifically, because the animal was still conscious when shackled, the shackle had to be applied to the leg almost instantaneously. This was done by spinning the chain around the leg and securing a hook at the end of the chain to an intermediate link. The subsequent release of the animal from such shackles led to a number of difficulties. The present invention solves these difficulties and, at the same time, provides an improved method for dispatching and bleeding animals which is humane, economic and practical.

Accordingly, it is the general object of the present invention to provide an improved means for humanely processing animals, particularly hogs, during packinghouse operations. More specifically, it is an object of the present invention to provide improved apparatuses for processing hogs during the dispatching and bleeding operations. Further, it is a specific object of the present invention to provide an improved shackle and unshackling apparatus which cuts costs and is fool-proof in commercial operation. These and other objects of the present invention will become apparent as the detailed description thereof proceeds.

The chain-and-sleeve-type shackle, which is advantageously employed in the process, comprises a tubular member open at both ends (also referred to hereinafter as a sleeve or thimble), said tubular member having a discontinuity on the exterior surface thereof, e.g., an external peripheral groove, protrusion, flange or the like, preferably a flange; and an elongated non-rigid member, e.g., cable, rope, chain, or the like, preferably a chain, suspended from an overhead support and threaded through said tubular member, the lower end of the non-rigid member being secured to the exterior of the tubular member. It is readily apparent that the lower end of the non-rigid member forms a securing loop suitable for suspending objects, e.g., hogs, therefrom. The discontinuity on the exterior surface of the tubular member, e.g., the external peripheral flange, renders the self-securing shackle suitable for automatic release by means of the unshackling apparatus of the present invention.

The apparatus for releasing the above-described self-securing shackle comprises sleeve-engaging jaws and means for at least momentarily raising the sleeve-engaging jaws during engagement with the sleeve. Typically, the unshackling apparatus also includes means for guiding the sleeve of the self-securing shackle into the sleeve-engaging jaws.

An example of a suitable means for raising the sleeve-engaging jaws may comprise a double-acting air cylinder which is normally non-movably mounted on the overhead conveyor rail. The piston of the cylinder is connected to the sleeve-engaging jaws by suitable linkages and moves the jaws up or down as compressed air is introduced into one end of the air cylinder or the other, respectively. The flow of compressed air is controlled by switch means, one portion of which is activated by contact with a shackle as the sleeve of a shackle is engaged by the jaws and results in an up-stroke of the piston and the attached jaws. Another portion of the switch means is activated by terminal upward movement of the jaws so as to reverse the stroke of the piston and return the jaws to the lowered position.

The present invention and its advantages will be more clearly understood from consideration of the following detailed description, read in conjunction with the accompanying drawings, wherein, FIGURE 1 is a front elevational view, partly cutaway, showing a typical plant layout employing the procedure of the present invention;

FIG. 2 is a top view of the plant layout shown in FIG. 1;

FIG. 3 is an enlarged side elevational view of one embodiment of the shackle of the present invention;

FIG. 4 is a side elevational view of one embodiment of the unshackling apparatus of the present invention, which may be advantageously employed in connection with chain-driven conveyor systems wherein the trolleys for supporting the shackles of the type shown in FIG. 3 roll on overhead I-beams;

FIG. 5 is a sectional view taken along section line 5—5 of FIG. 4;

FIG. 6 is a view taken along line 6—6 of FIG. 4;

FIG. 7 is a view taken in the same direction as FIG. 6, but in contrast to FIG. 6, shows the unshackling apparatus as the sleeve-engaging jaws complete the upstroke during the unshackling operation;

FIG. 8 shows another embodiment of the unshackling apparatus of the present invention which may be advantageously employed in connection with gravity-driven conveyor systems, wherein the trolleys for supporting the shackles roll on overhead flat rails;

FIG. 9 is a sectional view taken along sectional line 9—9 of FIG. 8;

FIG. 10 is a sectional view taken along sectional line 10—10 of FIG. 8;

FIG. 11 is a sectional view taken in the same direction as FIG. 9, but, in contrast to FIG. 9, shows the unshackling apparatus as the sleeve-engaging jaws complete the upstroke during the unshackling operation;

FIG. 12 is a sectional view taken along sectional line 12—12 of FIG. 9; and

FIG. 13 is a schematic diagram of the switch system which controls the up-stroke and down-stroke of the double-acting air cylinder of the unshackling aparatuses shown in FIGS. 4 through 12.

Referring to FIGS. 1 and 2 together, there is shown a plant layout utilizing one embodiment of the apparatuses of the present invention. It includes the hog ramp 20, by means of which the hogs to be slaughtered are guided to the restraining zone 21. The padded wall 22 of the restraining zone 21 is hinged at its upper corners so that the lower portion of the padded wall 22 can be swung outwardly to permit a hog to enter the confining space of restraining zone 21. After the hog enters, the padded wall 22 is forced inwardly towards the hog by means of the hydraulically or pneumatically-actuated piston of cylinder 23, thereby restraining the hog between the padded walls 22 and 24 and partially lifting the hog off moving belt conveyor 26. Hold-down bars 22a and 22b and supporting bar 22c are optionally present to prevent a second hog from climbing up on the back of the hog which is restrained, and escaping.

As soon as the hog has been restrained, it is rendered unconscious by a stuning device, such as an electric probe, which is operated by a stunner, who stands on the stunner's platform 25. Any other suitable means for rendering the hog unconscious may be employed. The stunning means should immobilize the hog and render it insensitive to pain. It should not, however, cause heart stoppage inasmuch as the pumping action of the heart is relied upon for proper bleeding of the carcass.

After the hog is rendered unconscious, the piston of the cylinder 23 is retracted and the stunned hog falls to the moving belt conveyor 26 and is conveyed to a gravity roller conveyor 27, which constitutes the dispatching and shackling zone.

When the stunned hog rolls onto the roller conveyor 27, the "sticker," who stands on platform 28, dispatches the hog and suspends the carcass from an overhead conveyor system 29 by means of a chain-and-sleeve-type shackle, a plurality of which 30a through 30f (and others not shown) are connected to the overhead conveyor system 29 by means of shackle trolleys 31a through 31f (and others not shown), respectively. These shackles and trolleys, details of which are shown in FIGS. 3 through 7, are conveyed along the I-beam or other rail 32 of the overhead conveyor system 29 by means of a chain drive 33 (which is only schematically portrayed). While only a few shackles are shown for economy of illustration, it should be understood that a great number of shackles are actually employed, each of the shackles being spaced, for example, at two-foot intervals along the chain drive 33. In another embodiment of the present invention, which will be further discussed in connection with FIGS. 8 through 12, the shackle trolley rolls on a sloping flat rail and relies primarily upon gravity for movement, rather than a chain drive. While in this specific example the hog is first dispatched and then suspended from the overhead conveyor system 29, it should be understood that the order of these two steps may be reversed, if desired.

After the hog has been dispatched and suspended from the overhead conveyor system 29 by means of the shackle of the present invention, it is raised by the upward movement of the shackle trolley, the upward slope of the conveyor system 29 being gradual so that the leg of the hog will not be unduly bruised, jolted out of socket, or otherwise injured. The suspended hog then passes over a blood trough 34 (usually a stainless steel sloping trough designed for gravity drainage), wherein effluent body from the carcass is received and drained to further processing. By the time a particular carcass is conveyed to the end of the blood trough 34, bleeding of the carcass is substantially complete. The speed of the conveyor system and the length of the blood trough are, of course, correlated to assure adequate bleeding.

The shackled carcass then passes via a drive sprocket 35 over a scalding bath 36 wherein the carcass is subjected to scalding water as a part of the dehairing operation. The unshackling operation which takes place over the scalding tub 36 has in the past been a "problem" operation.

In FIGS. 1 and 2, however, the shackles of the present invention are quickly and automatically unshackled by an unshackling apparatus 37. For example, one shackle, i.e., 30g, has just entered the unshackling apparatus 37, wherein the sleeve or thimble of the shackle is automatically raised, as is further described in detail in connection with FIGS. 4 through 7. The portion of the switch means which triggers the operation of the unshackling apparatus is, in this specific example, installed on the conveyor system 29 just before the unshackling apparatus 37. Thus a switch 38 is actuated by contact with the shackle trolley 31f (which triggers on actuator arm 38a of the switch 38, as is shown in subsequent figures). As a result, the unshackling apparatus 37 releases the carcass from the shackle 30g and drops it into the scalding vessel 36, as is suggested by the dashed outline of a falling carcass. After the unshackling operation, the shackle 30g is returned to the dispatching zone adjacent the gravity roller conveyor 27 via the conveyor system 29, and shackle 30f enters the unshackling apparatus, and so on.

Referring to FIG. 3, there is shown one embodiment of the shackle of the present invention. It comprises a tubular member 40, which is also called a sleeve or thimble, through which passes an elongated chain 41 or other non-rigid member such as a rope or cable, the lower end of which is secured to the lower end of the sleeve 40 by means of a half loop 42.

The shackle is provided with an external peripheral flange 43 or other engaging portion, which is the means by which the jaws of the unshackling apparatus (to be discussed hereinafter) engage and lift the sleeve. This flange is not to be confused with the optional lip or bead 44, which is present as a matter of design expediency, i.e., to provide structural strength and a smooth surface so that the links of the chain 41 can slide in and out of the sleeve 40 without difficulty. In addition to, or in place of the optional bead 44, the lower extremity of the sleeve 40 may be flared outwardly, again to facilitate sliding of the links of the chain 41 in and out of the sleeve 40. Such an alternative and optional embodiment is utilized in the embodiment of FIGS. 8 through 12, to be discussed hereinafter.

While the engaging portion illustrated in the figures is shown as the continuous external peripheral flange 43, it should be understood that any operative equivalent thereof, such as a continuous or discontinuous rim, outward extending protrusion, or the like may also be employed. In addition, external grooves, slots, indentations, or the like, into which the sleeve-engaging jaws may slip as the sleeve first enters the jaws, or thereafter, may also be employed. In certain embodiments, the jaws may also be under slight spring tension towards a closed position so that they will readily tend to slip into and engage such indentations on the sleeve as the jaws are moved vertically with respect thereto. These and other equivalents are considered within the scope of the present invention.

The upper extremity of the chain 41 is provided with conventional means for suspending the chain from a shackle trolley of the overhead conveyor system, as shown in FIG. 4. The means for securing the shackle may simply take the form of a repair link (preferably welded closed), swivel link, a bolt through one of the regular links, or the like.

Referring to FIGS. 4 through 7 together, these show various close-up views of the unshackling apparatus 37, which is mounted on the overhead conveyor system 29 of FIGS. 1 and 2. As aforementioned, the overhead conveyor system of FIGS. 1 and 2 is a chain-driven system wherein the shackle trolleys roll on an overhead I-beam.

The unshackling apparatus 37 comprises a pair of guide plates 50a and 50b, which are welded to both sides of the frame 51 and serve as a guide means for the sleeves of the shackles as they enter sleeve-engaging jaws 52a and 52b. The sleeve-engaging jaws 52a and 52b are movably mounted within the frame 51 by means of roller pairs 53a through d, and 54a through d, which roll up and down in channels 55 and 56 of the frame 51. The rollers are connected to the sleeve-engaging jaws 52a and 52b by means of the webs 57 and 58 respectively.

The roller pairs and sleeve-engaging jaws are raised by means of connecting rods 59 and 60, which connect the upper axles 61 and 62 of the roller pairs 53a–b and 54a–b, respectively, to the piston cross beam 63 of a piston 64 and a double-acting air cylinder 65. Just prior to being raised, the apparatus is as shown in FIG. 6 with the sleeve 40 of the loaded shackle between the sleeve-engaging jaws 52a and 52b. When compressed air is introduced into the lower section of air cylinder 65, the piston 64 is driven upward so as to raise the attached assembly, including the sleeve-engaging jaws 52a and 52b to its upper position illustrated in FIG. 7. Similarly, as compressed air is introduced into the upper portion of the double-acting cylinder 65, the piston is driven downward, along with the attached assembly, returning the assembly to its lower position.

Compressed air is supplied to the double-acting cylinder 65 by air lines (not shown) from a four-way momentary-contact double-solenoid-operated air valve 70 mounted on top of the frame 51. The air valve 70 is, in turn, controlled by the upswitch 38, so as to bring about an upstroke of the piston 64, and the down-switch 71, so as to bring about a down-stroke of the piston 64. The details of the control system for the double-acting air cylinder 65 are discussed hereinafter in connection with FIG. 13.

The shackle trolleys 31a through g (and others not shown) are spaced at predetermined intervals, e.g., two-foot intervals, as they roll along the I-beam 32 so that as the sleeve 30g enters the sleeve-engaging jaws 52a and 52b, the trolley 31f actuates the switch arm 38a of the switch 38, thereby causing an upstroke of the sleeve-engaging jaws 52a and 52b. The intervals between the shackle pulleys are readily controlled and adjusted by attaching the shackle pulleys to the appropriate links of the conveyor drive chain 33. As soon as the sleeve-engaging jaws 52a and 52b engage the external peripheral flange of the sleeve during the up-stroke, the sleeve is also lifted, thereby enlarging the loop of the chain below the sleeve of the shackle and releasing the carcass.

As the piston 64 completes its upstroke, a switch actuator 72, which is secured at an appropriate point on the connecting rod 59, actuates the switch arm 71a of a switch 71 so as to bring about the down-stroke, or return stroke, of the piston 64. The upstroke and downstroke occur so rapidly that the operation is substantially completed before the shackle is dragged out of the sleeve-engaging jaws 52a and 52b by the continued movement of the conveyor drive chain 33. Thus, the operating cycle of the unshackling apparatus is completed before the next shackle is guided into the sleeve-engaging jaws.

Referring to FIGS. 8 through 12, additional specific embodiments of both the shackle and the unshackling apparatus of the present invention are described. The shackle now to be described, however, can be used interchangeably with that already described in FIG. 3 in either embodiment of the unshackling apparatus.

With respect to the shackle shown in FIGS. 8 through 11, it will be noted that the sleeve of the shackle differs from that shown in FIG. 3 in that the external peripheral flange 43' is flush with the top of the sleeve, rather than adjacent the top. The external peripheral flange in each embodiment performs the same function. The shackle of FIGS. 8 through 11 also differs from that shown in FIG. 3 in that instead of the optional bead 44 at the bottom of the sleeve 41, a flared out section 44' is employed.

With respect to the unshackling apparatus of FIGS. 8 through 12, the apparatus illustrated is installed on a "flat-rail" conveyor system wherein the conveyor trolleys, to which the shackles are attached, are gravity driven, at least during a portion of the conveying path. Such a system is advantageously employed where for example, the suspended hogs are at an elevation substantially above the elevation of the scalding bath. Rather than chain-drive the trolleys and shackles to the scalding bath, the system can be simplified by employing a simple gravity drive. At some point in the continuous conveyor system, however, the shackle trolleys must be connected to a power lift to return them to the higher elevation.

In FIGS. 8 through 12, a shackle trolley 80, to which is affixed a trolley handle 80a for ease of handling and/or connection to a power-drive means, rolls on a flat-rail 81, said flat rail and a supporting I-beam 82 having a slope sufficient for gravity drive, for example, about ¾ inch per foot of linear distance. Thus, in operation, the shackle trolley 80 rolls down the flat rail 81 gravitationally until it encounters the unshackling apparatus. The sleeve 40' of the shackle is guided by means of a pair of guide plates 85a and 85b into a pair of separable sleeve-engaging jaws 86a and 86b. The guide plates 85a and 85b are secured to the support frame 87 by means of the welded webs 88a and 88b, respectively.

As the shackle trolley 80 and shackle enter into the unshackling apparatus, the upper portion of the shackle trolley 80 momentarily actuates an actuator 38a' of an upswitch 38'. Then, the trolley and shackle sleeve are stopped by contact, respectively, with a spring-loaded shackle trolley stop 89 and the terminus of the U-shaped slot formed by the juncture of the sleeve-engaging jaws 86a and 86b. The already-actuated lifting mechanism then raises the jaws and, as the jaws contact the flange 43', the shackle sleeve 40'.

It should be noted that in the lowered position, the separable sleeve engaging jaws 86a and 86b are held together by virtue of the geometry of the guide channels formed by the various portions of the support frame 87, including the frame portions 87a through h, wherein ride rollers 90a through d and 91a through d arranged in pairs. The axles of the roller pairs pass through webs 92 and 93, which in turn are welded to the two halves of the sleeve-engaging jaws 86a and 86b, respectively. The axles of the upper roller pairs 90a–b and 91a–b are pivotally mounted on the connecting rods 59' and 60' respectively. The center of gravity of each of the sleeve-engaging jaws 86a and 86b, including the webs 92 and 93 and roller pairs 90a through d and 91a through d, respectively, is such that the sleeve-engaging jaws would swing away from each other except for the restraining effect of frame portions 87d and 87f. The upper portions 87d' and 87f', respectively, extend outwardly so that as soon as the lower roller pairs, i.e., 90c–d and 91c–d, are raised above the outward extensions 87d' and 87f', the sleeve-engaging jaws 86 separate from one another, as illustrated in FIG. 11, so as to release the sleeve 40' of the shackle.

When the sleeve-engaging jaws are raised to the point at which the jaws swing open, the upper roller pair 91a–b engages the sloping surface 94' of the upstanding portion 94 of the shackle trolley stop 89 and forces it to the left, as shown in FIG. 11, by means of the wedging action of the rollers between the fixed guide portion 87h and the portions 94 and 94'. This action retracts the stop, as is suggested by some of the dashed lines on FIG. 12, and thereby permits the shackle trolley 80 to roll out of the unshackling apparatus gravitationally.

Movement of the shackle trolley stop 89 is confined to a horizontal plane by means of the guides 95a through d. The stop 89 is held in the stop position by means of the compressed spring 96, which abutts at one extremity the spring support 97 mounted on the guides 95b and 95d, and at the other extremity the upstanding portion 94 of the stop 89.

The power-actuated means for raising and lowering the sleeve-engaging jaws are substantially the same as that described in connection with FIGS. 4 through 7. The primary distinction lies in the fact that the upswitch 38' is actuated by the movement of the shackle trolley which is to be raised, rather than the shackle trolley which immediately follows it. This is necessitated by the fact that the spacing between the shackle trolleys in this gravity-driven system is obviously not controlled in the same way as it is in FIGS. 4 through 7, wherein the shackle trolleys are connected at fixed intervals to the links of a continuous chain. Because the means are otherwise the same, a detailed description of the mechanism shown in FIGS. 8 through 12 does not appear to be warranted. For ease of comparison, the same identifying numbers for the mechanism have been used in FIGS. 8 through 12 as were used in FIGS. 4 through 7, except that a "prime" mark after the number has been added to avoid confusion.

Further details of the control system for raising and lowering the sleeve-engaging jaws of both specific embodiments are presented in the schematic diagram of FIG. 13. Very briefly, the piston 64", which corresponds to the piston 64 in FIGS. 4, 6 and 7 and the piston 64' in FIGS. 8, 9 and 11, is raised by introducing compressed air via the line 100 and the speed control valve 101 into the lower portion of the air cylinder 65". Similarly, a downstroke of the piston 64" is initiated by introducing compressed air via the line 102 and the speed control valve 103 into the upper portion of the air cylinder 65". The compressed air originates at the supply source 104 and is supplied via the line 105, including filter-lubricators 106, to a four-way momentary-contact double-solenoid-operated air valve 70". Whether the air is supplied to the lower portion or the upper portion of the cylinder 65" depends on the position of the air valve 70".

The position of the air valve is governed by upswitch 38" and downswitch 71". Specifically, when a shackle trolley strikes the actuating arm of upswitch 38", electrical energy from, for example, a 110-volt A.C. source, is supplied to one of the solenoids of air valve 70", whereby the compressed air from source 104 is supplied to the lower portion of the cylinder 65" to raise the piston 64". As the piston 64" reaches the top of its stroke, a switch actuator (actuator 72 of FIGS. 6 and 7 and 72' of FIGS. 9 and 11) actuates downswitch 71", so as to supply electrical energy to the other solenoid of air valve 70", whereby compressed air from source 104 is introduced into the upper portion of cylinder 65" to lower the piston 64".

It is apparent from the above description of two specific embodiments that the objects of the present invention have been achieved. In general, an improved and humane means for processing animals, particularly hogs, during packinghouse operations have been achieved. More specifically, an improved shackle and unshacking apparatus is provided which is fool-proof in commercial operation.

While the present invention has been described in connection with certain specific embodiments thereof, it should be understood, as aforementioned, that the invention is not limited thereto. Many alternative modifications of the present invention will be apparent, in the light of the above description, to those skilled in the art, and such modifications are considered within the spirit and scope of the present invention.

Having thus described the invention, what is claimed is:

1. An apparatus for automatically unshackling self-securing shackles of a chain-and-sleeve type which apparatus comprises sleeve-engaging jaws; power-actuated means for lifting and lowering said jaws; and switch means for activating said power-actuated means, one portion of said switch means being activated by substantially-horizontal motion of a shackle as the sleeve of a shackle is engaged by said jaws whereby said power-actuated means lifts said jaws, and another portion of said switch means being activated by terminal upward movement of said jaws whereby said upward movement is terminated and said power-actuated means lowers said jaws.

2. The apparatus of claim 1 wherein said power-actuated means includes a double-acting air cylinder and piston, the piston being connected to said jaws, and said one portion of said switch means includes valve means whereby air is introduced into said cylinder to cause an up-stroke of said piston and said another portion of said switch means includes valve means whereby air is introduced into said cylinder to cause a down-stroke of said piston.

3. An apparatus for unshackling self-securing shackles of the chain-and-sleeve type, the sleeve of such shackles having an external peripheral engaging portion thereon, which apparatus comprises spaced jaws disposed to receive a sleeve subjacent the engaging portion thereof, and means for at least momentarily raising said jaws whereby said jaws engage said engaging portion and raise said sleeve.

4. An apparatus for unshackling self-securing shackles of the chain-and-sleeve type, such shackles having an external peripheral flange on the sleeve thereof and being movably suspended from overhead conveyor means, which apparatus comprises spaced-jaws movably supported from said overhead conveyor means and disposed to receive a sleeve subjacent the flange thereof, and means mounted on said conveyor means for at least momentarily raising said jaws, whereby said jaws engage said flange and raise said sleeve.

5. An apparatus for automatically unshackling self-securing shackles of the chain-and-sleeve type, the sleeve of such shackles having an external peripheral flange thereon, which apparatus comprises spaced jaws disposed to receive a sleeve subjacent the flange thereof, means for guiding the sleeve between said jaws, power-actuated lifting-and-lowering means for said jaws, and switch means for activating said power-actuated means, one portion of said switch means being activated by substantially-horizontal motion of a shackle as the sleeve of a shackle is guided into and engaged by said jaws whereby said power-actuated means lifts said jaws, and another portion of said switch means being activated by terminal upward movement of said jaws whereby said upward movement is terminated and said power-actuated means lowers said jaws.

6. An apparatus for automatically unshackling self-securing shackles of the chain-and-sleeve type, such shackles having an external peripheral flange on the sleeve thereof and being movably suspended from overhead conveyor means, which apparatus comprises spaced jaws movably supported from the overhead conveyor means and disposed to receive a sleeve subjacent the flange thereof, means mounted on said conveyor means for guiding the sleeve of a shackle between said jaws, power-actuated means mounted on the overhead conveyor means for lifting and lowering said jaws, and switch means for activating said power-actuated means, one portion of said switch means being activated by substantially-horizontal motion of a shackle as the sleeve of a shackle is engaged by said jaws whereby said power-actuated means lifts said jaws, and another portion of said switch means being activated by terminal upward movement of said jaws whereby said upward movement is terminated and said power-actuated means lowers said jaws.

7. An apparatus for unshackling self-securing shackles of the chain-and-sleeve type, the sleeve of such shackles having an external peripheral flange thereon, which apparatus comprises separable jaws forming a slot to receive a sleeve subjacent the flange thereof when the jaws are not separated; a frame surrounding said jaws, said frame constraining said jaws from separation in a lower portion thereof and permitting said jaws to separate in an upper portion thereof; and means for at least momentarily raising said jaws with respect to said frame whereby said jaws initially engage the flange and thereby raise the sleeve and thereafter separate and thereby release the flange.

8. An apparatus for automatically unshackling self-securing shackles of the chain-and-sleeve type, such shackles having an external peripheral flange on the sleeve thereof and being movably suspended from an overhead conveyor means, which apparatus comprises separable jaws forming a slot to receive a sleeve subjacent the flange thereof when the jaws are not separated; a frame supported by the overhead conveyor means and surrounding said jaws so as to constrain said jaws from separation in a lower portion thereof and to permit said jaws to separate in an upper portion thereof; and means mounted on said overhead conveyor means for at least momentarily raising said jaws with respect to said frame whereby said jaws initially engage the flange and thereby raise the sleeve and thereafter separate and thereby release the flange.

9. An apparatus for automatically unshackling self-securing shackles of the chain-and-sleeve type, the sleeve of such shackles having an external peripheral flange thereon, which apparatus comprises separable jaws having a U-shaped slot to receive a sleeve subjacent the flange thereof when the jaws are not separated; a frame surrounding said jaws, said frame constraining said jaws from separation in a lower portion thereof and permitting said jaws to separate in an upper portion thereof; means for guiding the sleeve of a shackle into said U-shaped slot; power actuated means for lifting and lowering said jaws; and switch means for activating said power-actuated means, one portion of said switch means being activated by engagement of said U-shaped slot and a sleeve, whereby said power-actuated means lifts said jaws so as to initially engage the flange and thereby raise the sleeve until said jaws separate and release the flange another portion of said switch means being activated by terminal upward movement of said jaws whereby said upward movement is terminated and said power-actuated means lowers said jaws.

10. An apparatus for automatically unshackling self-securing shackles of the chain-and-sleeve type, said shackles having an external peripheral flange on the sleeve thereof and being movably suspended from an overhead conveyor means, which apparatus comprises separable jaws having a U-shaped slot to receive a sleeve subjacent the flange thereof when the jaws are not separated; a frame surrounding said jaws, said frame being mounted on said overhead conveyor means and constraining said jaws from separation in a lower portion thereof, and permitting said jaws to separate in an upper portion thereof; means mounted on the conveyor means for guiding the sleeve of a shackle into said U-shaped slot; power actuated means mounted on the overhead conveyor means for lifting and lowering said jaws; and switch means mounted on said frame for activating said power-actuated means, one portion of said switch means being activated by engagement of said U-shaped slot and a sleeve, whereby said power-actuated means lifts said jaws so as to initially engage the flange and thereby raise the sleeve until said jaws separate and release the flange, and another portion of said switch means being activated by terminal upward movement of said jaws whereby said upward movement is terminated and said power-actuated means lowers said jaws.

11. An abattoir apparatus for picking up a stunned animal at one location and depositing the animal at a second location, said apparatus including: overhead conveyor means having downwardly-depending shackles of the chain-and-sleeve type, whereby the stunned animal, before or after being dispatched, may be readily suspended from said overhead conveyor means; a trough disposed beneath at least a portion of said overhead conveyor means to receive blood released from the suspended and dispatched animal gravitationally; unshackling means disposed at another portion of said overhead conveyor means, said unshackling means including sleeve-engaging jaws for receiving the sleeves of shackles and means for at least momentarily raising said sleeve-engaging jaws during engagement with a sleeve, whereby the animal carcass is automatically released from the shackle.

12. An abattoir apparatus for picking up a stunned animal at a platform on which the stunned animal rests and depositing said animal at a second location, said apparatus including: a support platform for receiving the stunned animal; overhead conveyor means adjacent said platform, said overhead conveyor means having downwardly-depending shackles of the chain-and-sleeve type, the sleeves of said shackles having an external peripheral flange, whereby the stunned animal after being dispatched on said support platform may be readily suspended from said overhead conveyor means; a trough disposed beneath at least a portion of said overhead conveyor means to receive blood released from the animal gravitationally; and unshackling means mounted at another portion of said conveyor means, said unshackling means including spaced jaws disposed to receive a shackle sleeve subjacent the flange thereof, and means for at least momentarily raising said jaws during engagement with said sleeve, whereby said jaws engage said flange and raise said sleeve so as to release the animal carcass from said shackle.

13. An abattoir apparatus for picking up the stunned animal at a platform on which the stunned animal rests and depositing said animal at a second location, said apparatus including: overhead conveyor means adjacent said platform, said overhead conveyor means having downwardly depending shackles of the cable-and-sleeve type whereby the animal, after being dispatched on said support platform, may be readily suspended from said overhead conveyor means; a trough disposed beneath at least a portion of said overhead conveyor means for gravitational receipt of blood released from the carcass as it is conveyed overhead; and unshackling means disposed at another portion of said conveyor means, said unshackling means including movable spaced jaws disposed to receive a shackle sleeve subjacent the flange thereof, power-actuated means for lifting and lowering said jaws, and switch means for activating said power-actuated means, one portion of said switch means being activated by substantially-horizontal motion of a shackle as the sleeve of a shackle is engaged by said jaws whereby said power-actuated means lifts said jaws and thereby raises said sleeve so as to release the animal carcass, and another portion of said switch means being activated by terminal upward movement of said jaws whereby said upward movement is terminated and said power-actuated means lowers said jaws.

14. An abattoir apparatus for conveying an animal from one location to a second location, said apparatus comprising in combination: a conveyor trained for movement along a predetermined path in a given direction, said conveyor at a first point in said path having a comparatively low elevation and gradually increasing to a greater elevation in said direction from said point; a plurality of shackles each including a tubular member having an engaging portion on the exterior thereof, and an elongated non-rigid member having a lower end and an upper end, the upper ends of said non-rigid members being attached at spaced intervals to said conveyor, said non-rigid member of each shackle extending from said upper end through its respective tubular member, forming a loop and being affixed to said tubular member, whereby when said loop is slipped over an animal's extremity at said point the upward movement of the conveyor thereafter will tighten the loop about the extremity and pick up the animal; and an unshackling device located below said conveyor at a second point along said path, said device including means to engage said engaging portion, power-actuated means connected to said engaging means to raise and lower the same, and switch means for activating said power-actuated means, one portion of said switch means being activated by substantially-horizontal motion of a shackle as the sleeve of a shackle is engaged by said engaging means, whereby said power-actuated means lifts said engaging means, and another portion of said switch means being activated by terminal upward movement of said engaging means to terminate said upward movement and to lower said engaging means.

15. An abattoir apparatus for conveying an animal from one location to a second location, said apparatus comprising in combination: a conveyor trained for movement along a predetermined path in a given direction, said conveyor at a first point in said path having a comparatively low elevation and gradually increasing to a greater elevation in said direction from said point; a plurality of shackles each including a tubular member open at both ends, said tubular member having an engaging portion on the exterior thereof, and an elongated non-rigid member suspended from said conveyor and threaded through said tubular member, the lower end of said non-rigid member being secured to the exterior of said tubular member, whereby a securing loop is formed, whereby when said loop is slipped over an animal's extremity at said point the upward movement of the conveyor thereafter will tighten the loop about the extremity and pick up the animal; and an unshackling device located below said conveyor at a second point along said path, said device including sleeve-engaging jaws, power-actuated means for lifting and lowering said jaws, and switch means for activating said power-actuated means, one portion of said switch means being activated by substantially-horizontal motion of a shackle as the sleeve of a shackle is engaged by said jaws, whereby said power-actuated means lifts said jaws, and another portion of said switch means being activated by terminal upward movement of said jaws whereby said upward movement is terminated and said power-actuated means lowers said jaws.

16. An abattoir apparatus for conveying an animal from one location to a second location, said apparatus comprising in combination: a conveyor trained for movement along a predetermined path in a given direction, said conveyor at a first point in said path having a comparatively low elevation and gradually increasing to a greater elevation in said direction from said point, said conveyor having a shackle connector; a shackle including a tubular member having an engaging portion on the exterior thereof, and an elongated non-rigid member having a lower end and an upper end, the upper end of said non-rigid member being connected to said connector, said non-rigid member extending from said upper end through the tubular member forming a loop and being affixed to the tubular member, whereby when said loop is slipped over an animal's extremity at said point the upward movement of the conveyor thereafter will tighten the loop about the extremity and pick up the animal; and an unshackling device located below said conveyor at a second point along said path, said device including means to engage said engaging portion, and power-actuated means to decrease the distance between said connector and said tubular member to permit the loop to increase in size and release the extremity.

17. An apparatus as set forth in claim 16, wherein a trough is disposed below said conveyor at a position between said two points.

References Cited in the file of this patent
UNITED STATES PATENTS

| | | |
|---|---|---|
| 68,714 | Dalton | Sept. 10, 1867 |
| 388,021 | Byrne | Aug. 21, 1888 |
| 724,015 | Jones | Mar. 31, 1903 |
| 976,316 | Thomson | Nov. 22, 1910 |
| 1,719,030 | Smith | July 2, 1929 |
| 1,837,514 | Agar | Dec. 22, 1931 |
| 2,652,589 | Spooner | Sept. 22, 1953 |
| 2,733,477 | Murphy | Feb. 7, 1956 |
| 2,846,721 | Schonwise | Aug. 12, 1958 |
| 2,978,737 | Hughes | Apr. 11, 1961 |

UNITED STATES PATENT OFFICE
CERTIFICATE OF CORRECTION

Patent No. 3,111,706            November 26, 1963

Ernest A. Kopp

It is hereby certified that error appears in the above numbered patent requiring correction and that the said Letters Patent should read as corrected below.

Column 3, line 74, for "body" read -- blood --; column 10, lines 17 and 18, strike out "a support platform for receiving the stunned animal;".

Signed and sealed this 21st day of April 1964.

(SEAL)
Attest:

ERNEST W. SWIDER            EDWARD J. BRENNER
Attesting Officer            Commissioner of Patents